US011221043B2

(12) United States Patent
Holder et al.

(10) Patent No.: US 11,221,043 B2
(45) Date of Patent: Jan. 11, 2022

(54) STABILIZER BEARING FOR MAST OF ROTARY DISTRIBUTOR

(71) Applicant: OVIVO INC., Montreal (CA)

(72) Inventors: Robert Eugene Holder, Herriman, UT (US); Richard Darin Swan, Cedar Hill, UT (US); Brendan Joseph Kelly, Austin, TX (US)

(73) Assignee: OVIVO INC., Montreal (CA)

( * ) Notice: Subject to any disclaimer, the term of this patent is extended or adjusted under 35 U.S.C. 154(b) by 60 days.

(21) Appl. No.: 16/939,630

(22) Filed: Jul. 27, 2020

(65) Prior Publication Data

US 2021/0033146 A1    Feb. 4, 2021

Related U.S. Application Data

(60) Provisional application No. 62/879,779, filed on Jul. 29, 2019.

(51) Int. Cl.
*F16C 17/02*    (2006.01)
*F16C 35/02*    (2006.01)
(Continued)

(52) U.S. Cl.
CPC .............. *F16C 33/18* (2013.01); *C02F 3/043* (2013.01); *F16C 17/022* (2013.01);
(Continued)

(58) Field of Classification Search
CPC .... F16C 17/022; F16C 33/043; F16C 33/046; F16C 33/122; F16C 33/18; F16C 33/203; F16C 33/205; F16C 33/208; F16C 33/74; F16C 2208/04; F16C 2208/32; F16C 35/02; F16C 35/10; C02F 3/043
See application file for complete search history.

(56) References Cited

U.S. PATENT DOCUMENTS 6,659,113 B2 * 12/2003 Wilcher ............. B01D 21/2461
                                                        134/132
11,073,212 B1 *  7/2021 Kozel .................... F04D 29/10
(Continued)

OTHER PUBLICATIONS

SKF filament wound bushing PDF. Published Jun. 2008 (Year: 2008).*

*Primary Examiner* — Alan B Waits
(74) *Attorney, Agent, or Firm* — R. Neil Sudol; Henry D. Coleman

(57) ABSTRACT

A split stabilizer bearing for a mast of a rotary distributor includes a split cylindrical housing, a split filament wound bushing, a plurality of polytetrafluoroethylene-coated carbon fiber ring seals, an annular split seal retainer, and multiple fasteners. The filament wound bushing is disposed inside the housing, along an inner surface thereof. The bushing has a backing layer of high-strength glass fiber and an inner sliding layer of polytetrafluoroethylene (PTFE) and polymer fiber, the two layers both embedded in a epoxy resin matrix. The carbon fiber ring seals are disposed on axially or longitudinally opposed sides of the bushing and along an inner side or surface of the cylindrical housing, preferably in respective annular recesses or offsets along the inner side or surface of the housing. The fasteners, nylon-patch locking screws or bolts, couple the bushing and the split seal retainer to the housing.

5 Claims, 6 Drawing Sheets

(51) Int. Cl.
    *F16C 33/20*     (2006.01)
    *F16C 33/18*     (2006.01)
    *C02F 3/04*     (2006.01)
    *F16C 33/74*     (2006.01)

(52) U.S. Cl.
    CPC ............ *F16C 33/205* (2013.01); *F16C 33/74* (2013.01); *F16C 35/02* (2013.01); *F16C 2208/04* (2013.01); *F16C 2208/32* (2013.01)

(56) References Cited

U.S. PATENT DOCUMENTS

| | | | |
|---|---|---|---|
| 2015/0023620 A1* | 1/2015 | Chabert | F16C 17/14 |
| | | | 384/100 |
| 2017/0058947 A1* | 3/2017 | Floan | B01D 11/0269 |
| 2017/0175812 A1* | 6/2017 | Masse | F16C 29/02 |
| 2020/0200212 A1* | 6/2020 | Brown | F16C 17/10 |

* cited by examiner

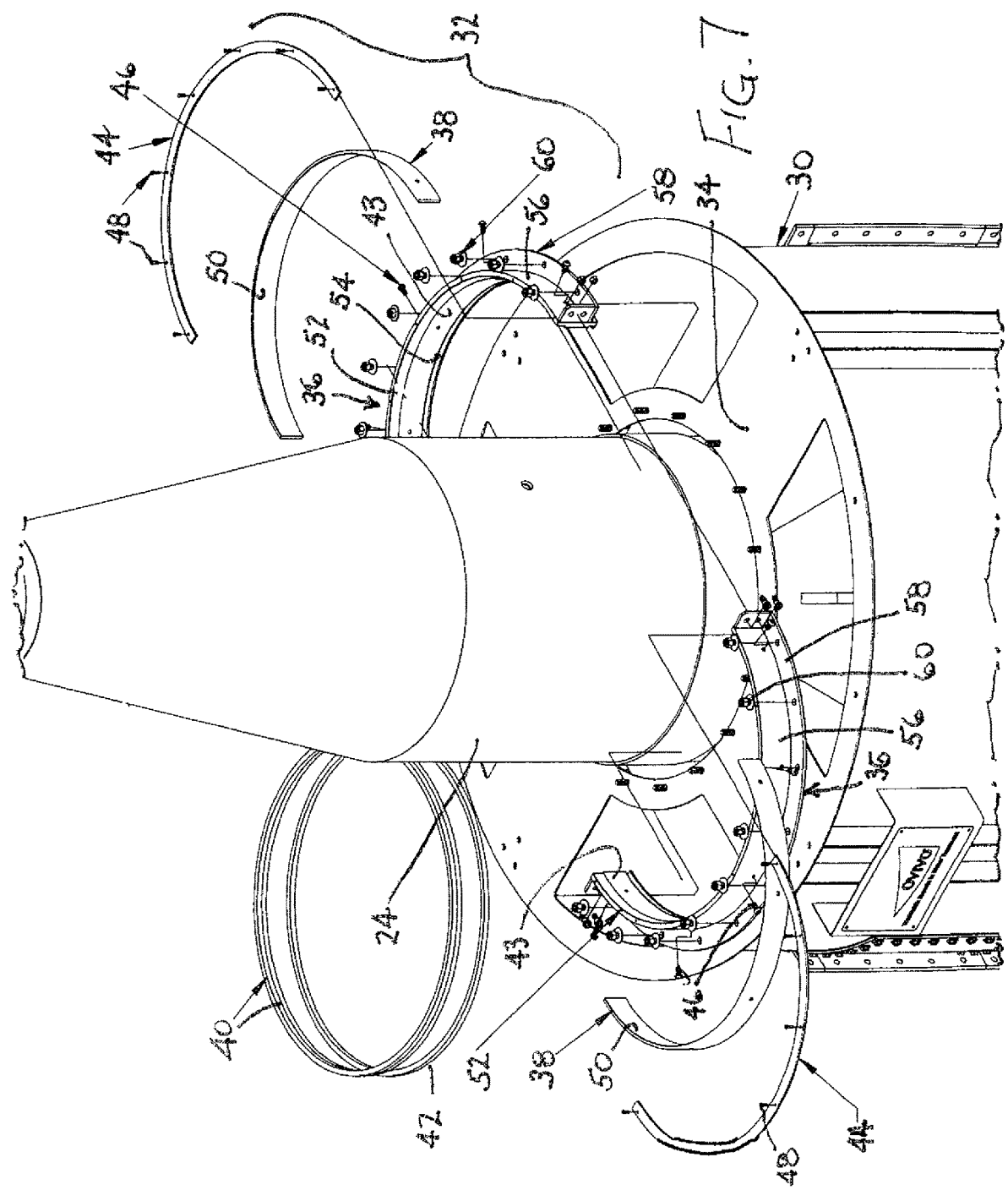

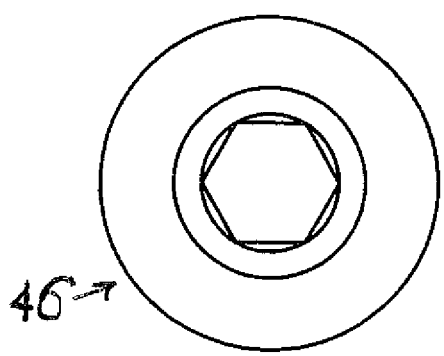
FIG. 8B
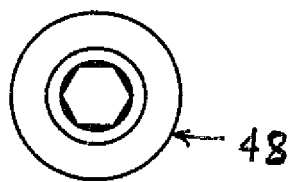
FIG. 9B
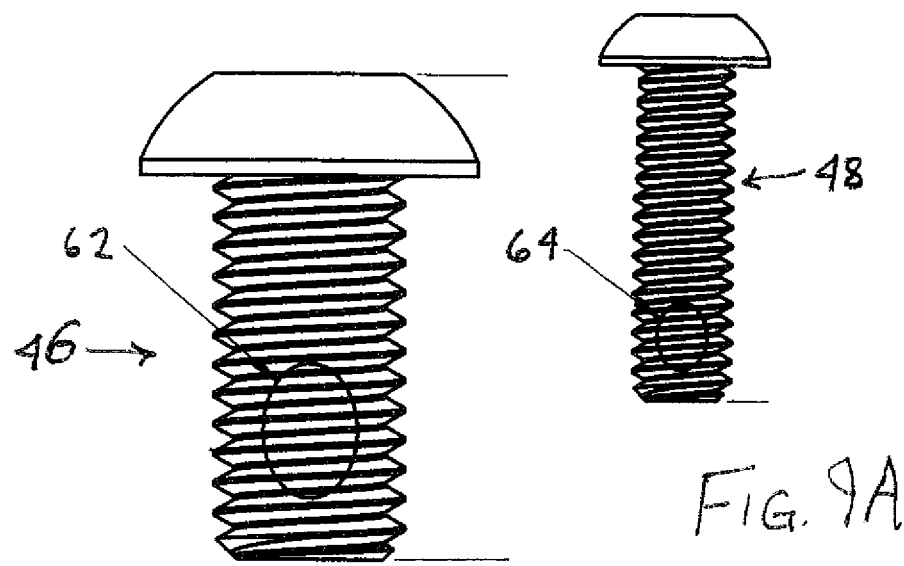
FIG. 8A
FIG. 9A

STABILIZER BEARING FOR MAST OF ROTARY DISTRIBUTOR

BACKGROUND OF THE INVENTION

This invention relates to bearings for rotary distributors particularly in trickling sewage-treatment filters.

Trickling filters have been employed as one of the principal stages of sewage treatment for many years. Trickling filter systems conventionally use a layered filter bed of stones coated with biological treatment media, namely, micro-organisms. In recent years, a plastic filter media, sometimes of a honeycomb design, has replaced stone in the filter bed. A mechanical and hydraulic distribution system for sprinkling raw sewage liquor over the top of the bed includes pipes or arms extending in a radial or spoked array from a centerwell. Sprinkler heads spaced from one another along the lengths of the pipes or arms spray or eject liquid sewage as the spoked assembly rotates about a vertical axis. Overhead tie-rods or cables extending from a centerwell mast, as well as cables extending horizontally between the sprinkler arms, support the arms in a fixed configuration. The sewage liquid enters the distributor pipes or arms at their radially inward ends through the centerwell or mast. As the distribution process occurs, the liquor is discharged horizontally from sprinkler-head discharge ports located on the same side of each of the distribution pipes. As a result, at substantial flow rates, an inertial reaction of the distribution pipes to the fluid flow jetting out behind the pipe causes the distribution system to rotate. A motor is also sometimes used to assist in the rotation. By proper placement of the discharge ports, a distribution system can be designed to distribute the liquor evenly over the top of the bed. As the liquor passes down through the filter bed, biological degradation processes the sewage and liquefies the suspended solids.

Typically, the distributor is rotatably supported on the center mast on a thrust bearing and uses a stabilizer bearing to prevent the distributor pipes or arms from rotating out of a horizontal plane. This bearing generally requires routine maintenance that is difficult by virtue of the location of the stabilizer bearing on the centerwell mast. Maintenance personnel must walk over slippery filter rock or plastic media while carrying requisite equipment to service the rotary distributor.

OBJECTS OF THE INVENTION

It is an object of the present invention to provide an improved stabilizer bearing for a rotary distributor particularly of a trickling filter.

A more particular object of the present invention is to provide such a stabilizer bearing that requires less routine maintenance.

These and other objects of the invention will be apparent from the drawings and descriptions herein. Although each of the objects of the invention is believed to be attained in at least one embodiment of the invention, there is not necessarily any one embodiment that achieves all of the objects of the invention.

SUMMARY OF THE INVENTION

A stabilizer bearing for a rotary distributor, exemplarily for mounting on a mast of a trickling filter, and keeping an array of distributor arms rotating in a horizontal plane comprises a split cylindrical housing, a split filament wound bushing, polytetrafluoroethylene-impregnated carbon fiber packing seals, an annular split seal retainer, and multiple fasteners.

The filament wound bushing is disposed inside the housing, along an inner surface thereof. The bushing has an outer or backing layer made of glass fibers and an inner sliding surface or layer made of polytetrafluoroethylene (PTFE) and polymer fibers. Both layers are embedded in an epoxy resin matrix.

The PTFE-impregnated carbon fiber packing seals are disposed in annular configurations on axially or longitudinally opposed sides of the bushing and along an inner side or surface of the cylindrical housing, preferably in respective annular recesses or offsets along the inner side or surface of the housing. The fasteners couple the bushing and the split seal retainer to the housing.

The housing, bushing and seal retainer are all split in order to allow servicing of the equipment and parts without disassembling the overall mechanism.

The lower carbon fiber seal is assembled by packing lengths of the PTFE-impregnated carbon fiber into a recess or offset at the lower end of the housing. The upper seal is inserted as two continuous windings of the packing into a recess or offset at the lower end of the housing and held in with the split retainer.

The housing includes an outwardly extending annular flange along one circular edge or end, for attachment to an upper surface of a filter centerwell.

Preferably, the fasteners are nylon-patch locking screws or bolts, that is, threaded fasteners that incorporate a nylon patch.

A stabilizer bearing pursuant to the present invention exhibits reduced maintenance requirements in part because the PTFE layer or coating eliminates the requirement for frequently lubrication or grease application. In addition, the carbon fiber ring seals largely prevent contaminants from damaging the bushing. The carbon fiber ring seals also reduce friction during machine operation. Moreover, the use of nylon-patch locking screws or bolts prevent the system from working loose due to vibration.

BRIEF DESCRIPTION OF THE DRAWINGS

FIG. 7 is an exploded partial top and front perspective view of the centerwell and mast assembly of FIGS. 1-3.

FIGS. 8A and 8B are a side elevation view and a top plan view, respectively of a screw or bolt holding a bushing to a housing wall, as shown in FIG. 4.

FIGS. 9A and 9B are a side elevation view and a top plan view, respectively of a screw or bolt holding split seal retainer to a housing wall, as shown in FIG. 4.

DETAILED DESCRIPTION

Figure 1:
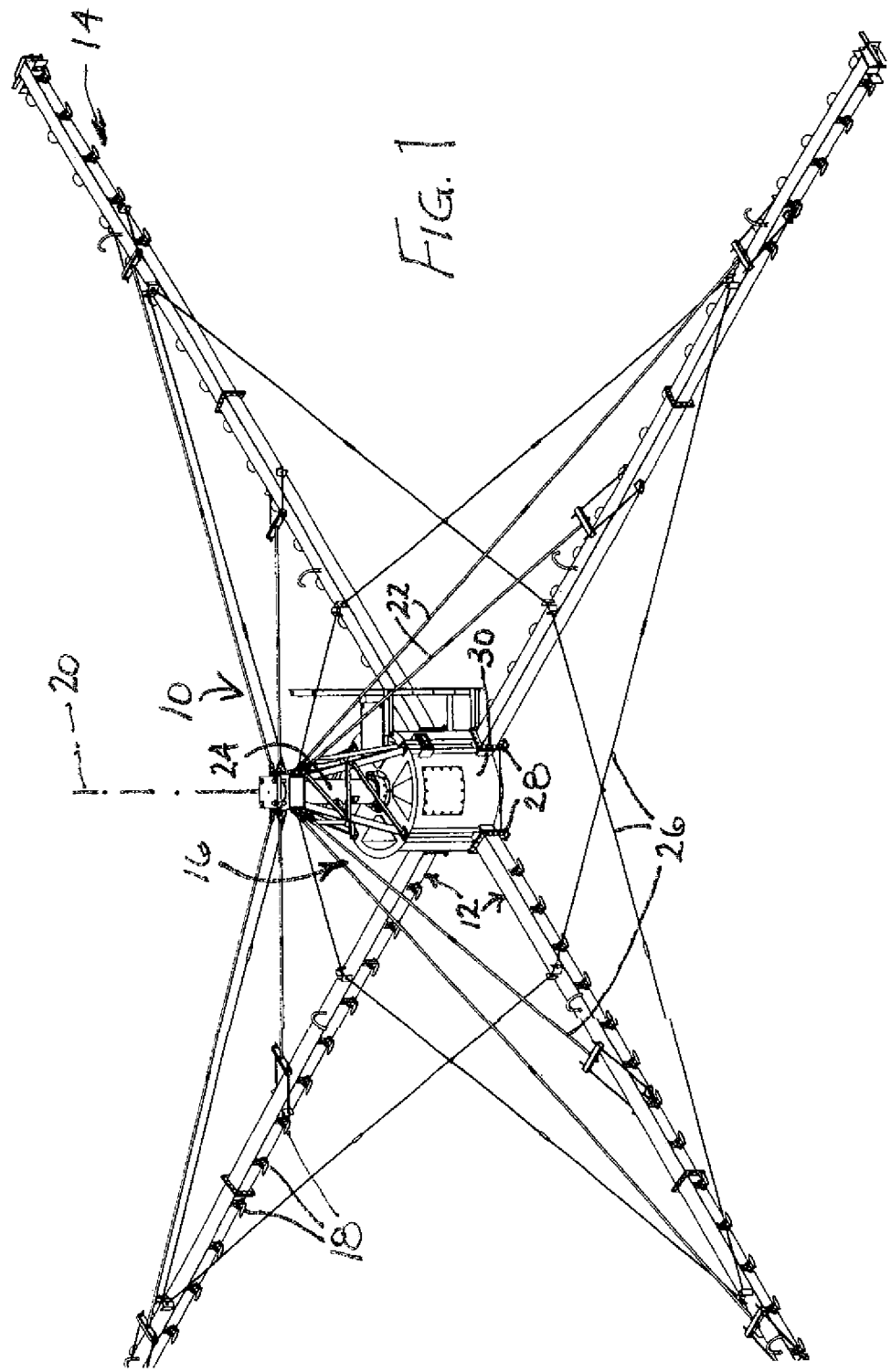
FIG. 1 is a top and front perspective view of a rotary distributor for a trickling sewage-treatment filter, incorporating a stabilizer bearing in accordance with the present invention.

As depicted in FIG. 1, a rotary distribution system 10 for sprinkling raw sewage liquor over the top of a biological-media filter bed in a tricking filter includes a plurality of pipes or arms 12 extending in a radial or spoked array 14 from a centerwell and mast assembly 16. Sprinkler heads or ports 18 are spaced from one another along the pipes or arms 12 for spraying or ejecting liquid sewage as the spoked assembly 14 rotates about a vertical axis 20. Overhead tie-rods or cables 22 extending from a top of a centerwell mast 24. Cables 26 extend horizontally between adjacent pairs of sprinkler arms 12. Rods 22 and cables 26 support the arms 12 in a fixed configuration. Sewage liquid enters distributor arms 12 at their radially inward ends 28 through a centerwell 30. As the distribution process occurs, the liquor is discharged horizontally from sprinkler heads or discharge ports 18, which are all located on the same side of each of the distribution arms 12, providing a jet-type propulsion to the centerwell 21 and arms 12 of the distribution system 10.

Figure 2:
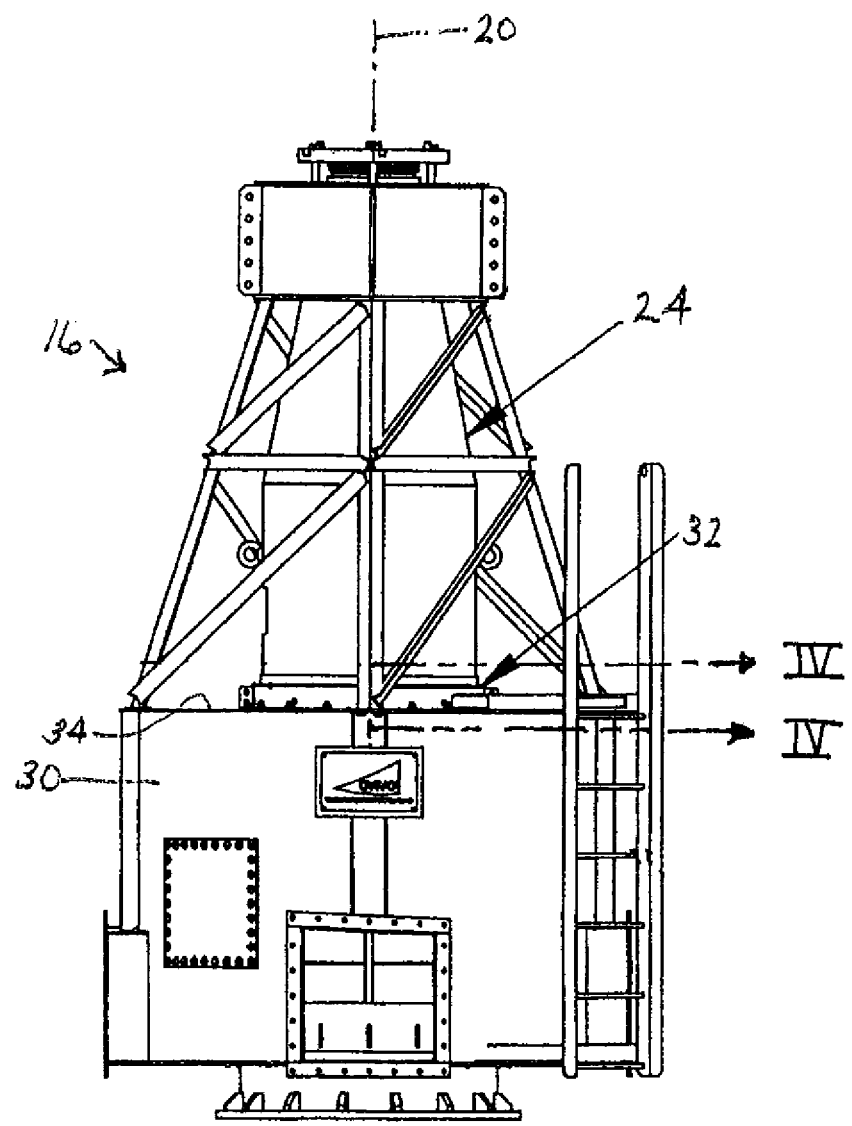
FIG. 2 is a front elevational view of a centerwell and mast assembly of the rotary distributor of FIG. 1.
Figure 3:
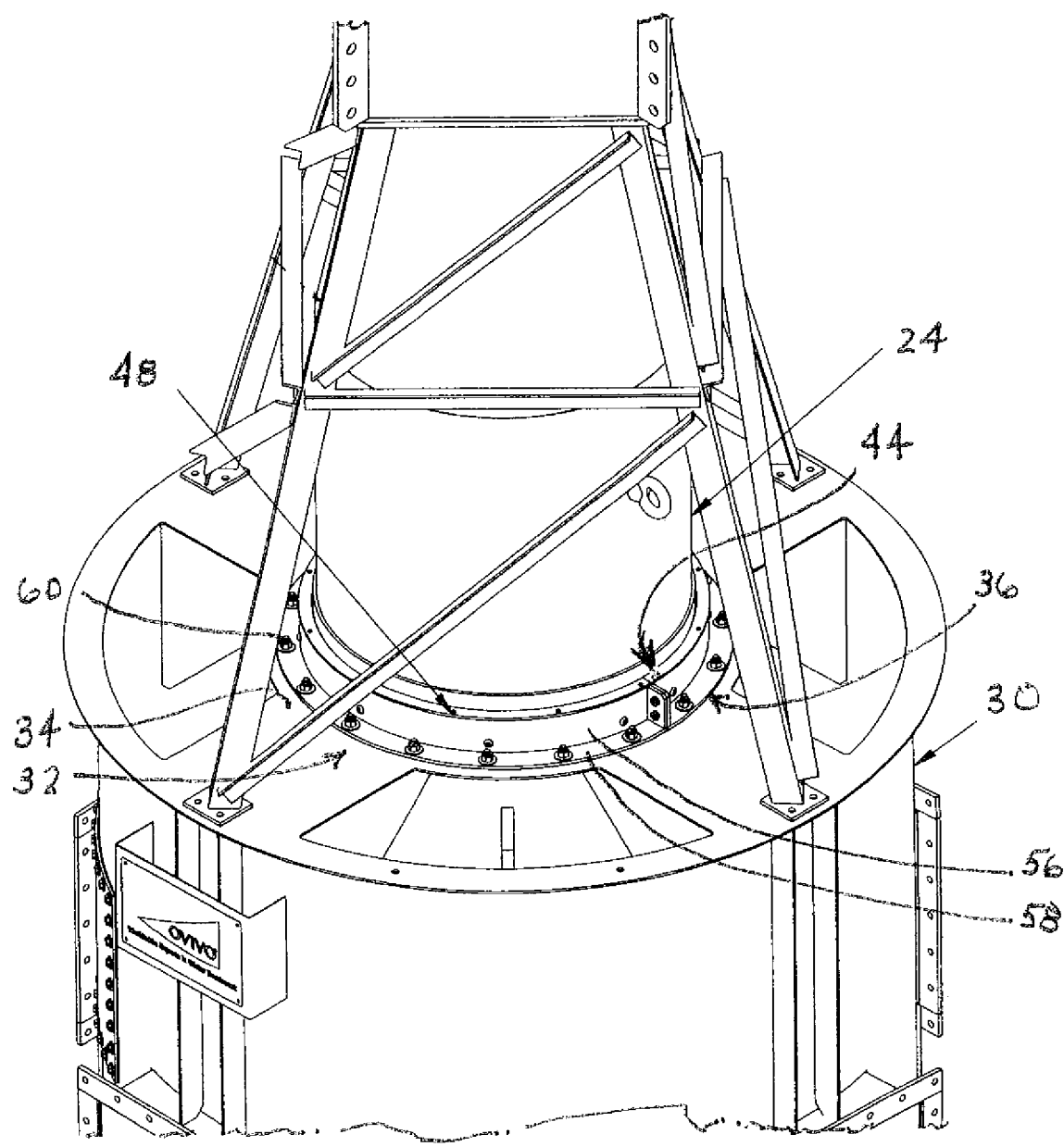
FIG. 3 is a partial top and front perspective view of the centerwell and mast assembly of FIGS. 1 and 2, on a larger scale, showing the stabilizer bearing in accordance with the present invention.
Figure 5:
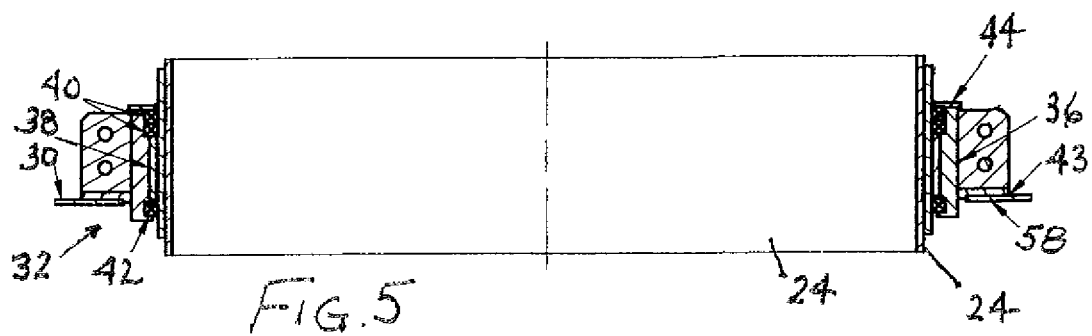
FIG. 5 is vertical cross-sectional view of the stabilizer bearing of FIGS. 2-4, taken along a line in the plane of FIG. 2, perpendicular to the plane of FIG. 4.
Figure 4:
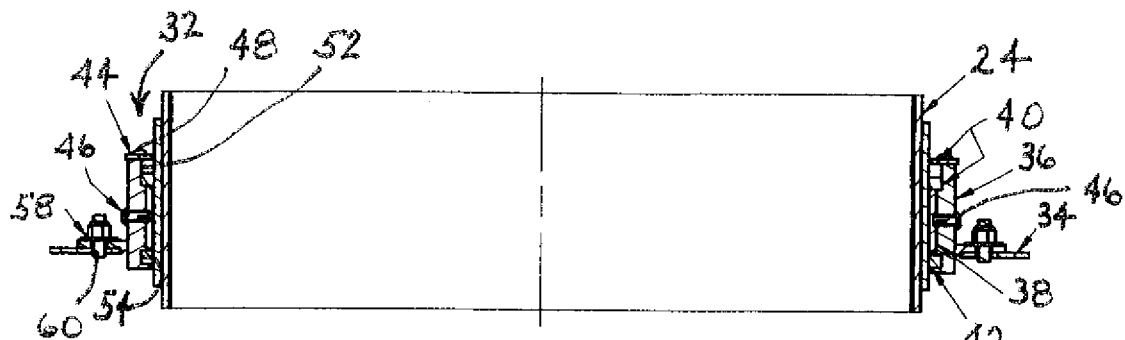
FIG. 4 is a vertical cross-sectional view of the stabilizer bearing of FIGS. 2 and 3, taken along line Iv-Iv in FIG. 2.
Figure 6:
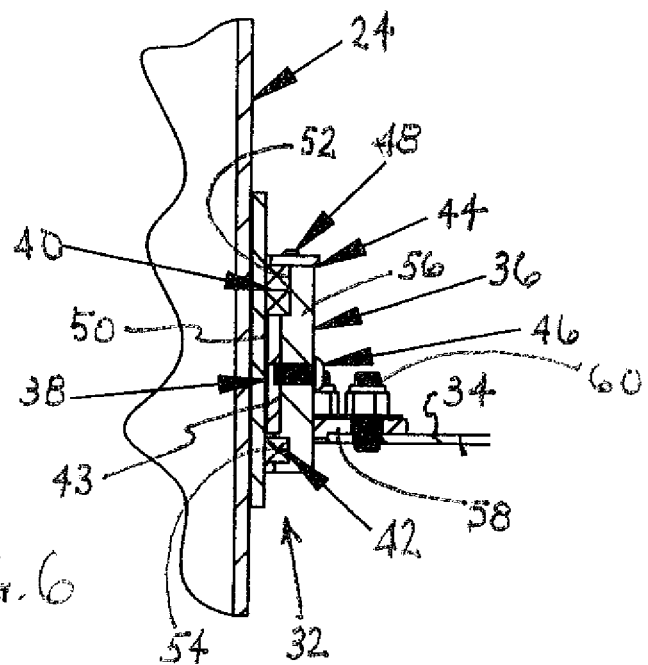
FIG. 6 is a partial cross-sectional view, on a larger scale, of the stabilizer bearing as shown in FIG. 4.

FIGS. 2 and 3 show a cylindrical stabilizer bearing 32 for mounting to mast 24 of rotary distributor 10. Bearing 32 is located on an upper surface 34 of centerwell 20 and surrounds mast 24. As depicted in FIGS. 2-7, bearing 32 comprises a split cylindrical housing 36, a split filament wound bushing 38, a plurality of polytetrafluoroethylene-coated carbon fiber ring seals 40 and 42, an annular split seal retainer 44, and multiple fasteners 46 and 48.

Filament wound bushing 38 is disposed inside housing 36, along an inner surface 43 thereof. Bushing 38 has an outer or backing layer made of high-strength wound glass fibers (not separately illustrated) and an inner sliding surface or layer 50 made of PTFE and polymer fibers (not depicted). Both layers are embedded in an epoxy resin matrix. Such bushings are manufactured and distributed, for example, by the Swedish concern, SKF Group.

The polytetrafluoroethylene-impregnated carbon fiber packing seals 40 and 42 are disposed in annular configurations on axially or longitudinally opposed sides of bushing 38 and along inner side or surface 43 of cylindrical housing 36.

Lower carbon fiber seal 42 is assembled by packing two lengths of the PTFE-impregnated carbon fiber into a recess or offset 54 at the lower end of housing 36, one packing length for each half of the split housing. Upper seal 40 is inserted as two continuous windings of a single length of the PTFE-impregnated carbon packing into a recess or offset 52 at the lower end of housing 36 and held in with split seal retainer 44.

PTFE-impregnated carbon fiber packing seals 40 and 42 may be formed using compression packing produced and distributed by, for example, Garlock Sealing Technologies of Palmyra, N.Y.

Fasteners 46 and 48 couple the bushing and the split seal retainer to the housing. Fasteners 46 extend horizontally through a cylindrical side wall 56 of housing 36 into bushing 38 to thereby attach the bushing to the housing. Fasteners 48 extend vertically though split seal retainer 44 and into housing 36 to attach the split seal retainer to the housing.

Housing 36 includes an outwardly extending annular flange 58 along a lower circular edge or end (not separately labeled). Screws or bolts 60 secure flange 58, and concomitantly housing 36 as a whole, to upper surface 34 of centerwell 30.

As depicted in FIGS. 8A and 9A, fasteners 46 and 48 constitute locking screws or bolts, with nylon patches 62 and 64, respectively. Patches 62 and 64 prevent fasteners 46 and 48 from working loose due to vibration.

It is to be noted that the present stabilizer bearing 32 may be employed for use with motor-assisted rotary distributors, as well as rotary distributors rotatably driven solely by liquid ejection or dispensing pursuant to momentum conservation (Newton's third law).

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A stabilizer bearing for a rotary distributor, said stabilizer bearing comprising:
    a split cylindrical housing;
    a split filament wound bushing disposed inside said housing, along an inner surface thereof, said bushing having a backing layer of glass fibers and an inner sliding layer or surface of PTFE and polymer fibers;
    sealing rings of PTFE-impregnated carbon fiber packing disposed in a plurality of annular configurations on axially or longitudinally opposed sides of said bushing and along an inner side of said cylindrical housing;
    an annular split seal retainer; and
    fasteners coupling said split bushing and said split seal retainer to said housing.

2. The stabilizer bearing defined in claim 1 wherein said housing includes an outwardly extending annular flange along one circular edge or end.

3. The stabilizer bearing defined in claim 1 wherein said fasteners are nylon-patch locking screws or bolts.

4. The stabilizer bearing defined in claim 1 wherein the glass fibers in said outer layer of said filament wound bushing are high-strength glass fibers.

5. The stabilizer bearing of claim 1 wherein said sealing rings of PTFE-impregnated carbon fiber packing are disposed in annular recesses on said housing.

* * * * *